Oct. 1, 1957  J. A. HUDSON ET AL  2,808,498
WELDING TORCH WIRE FEED
Filed March 1, 1956
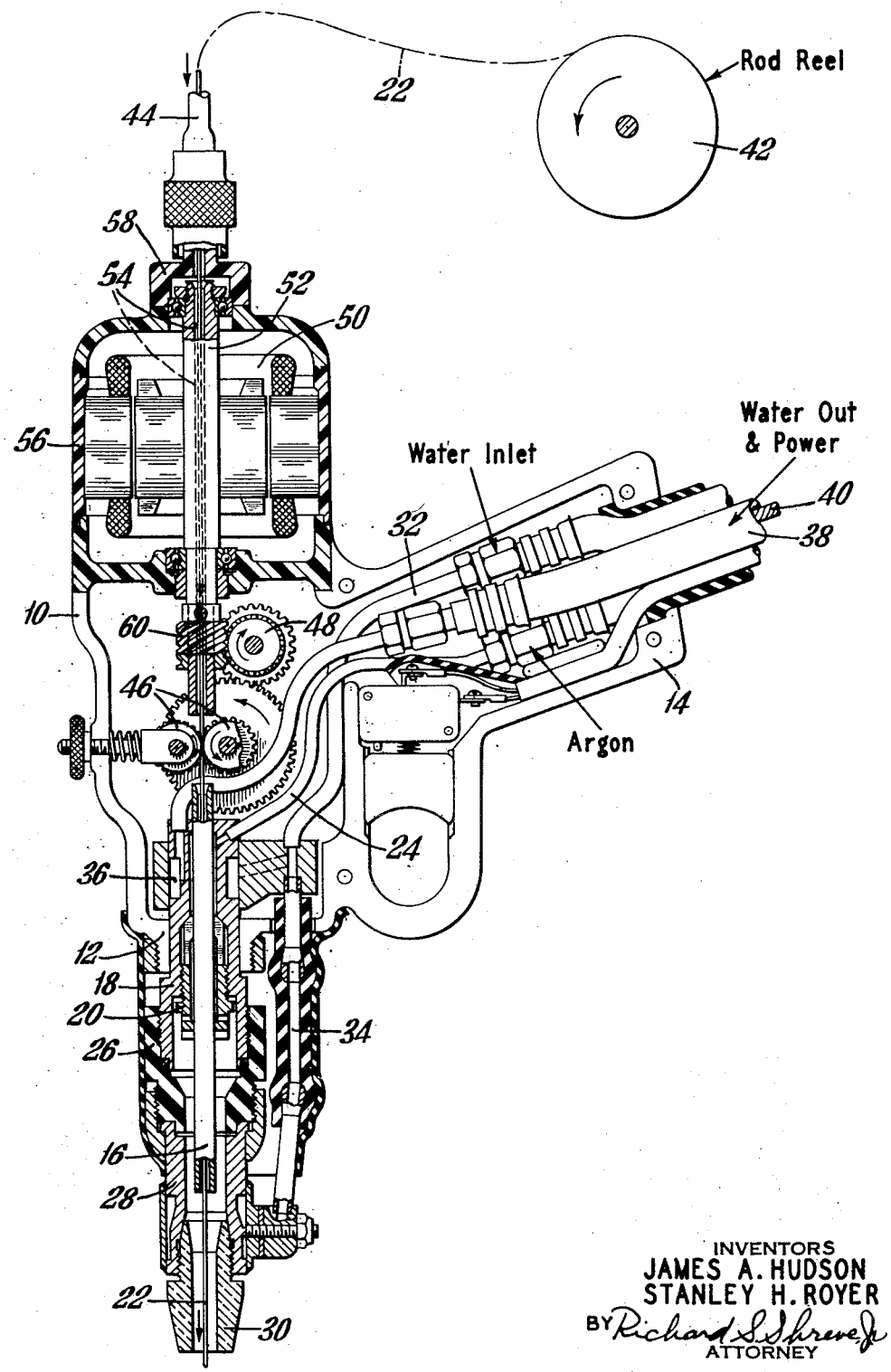
INVENTORS
JAMES A. HUDSON
STANLEY H. ROYER
BY Richard S. Shreve Jr.
ATTORNEY

2,808,498

Patented Oct. 1, 1957

2,808,498
WELDING TORCH WIRE FEED

James A. Hudson, Chicago, Ill., and Stanley H. Royer, Elizabeth, N. J., assignors to Union Carbide Corporation, a corporation of New York Application March 1, 1956, Serial No. 568,908

5 Claims. (Cl. 219—130)

This invention relates to welding torch wire feed, and more particularly to mechanism of this character for feeding ware through inert gas shielded metal arc welding torches.

In the McElrath Patent No. 2,606,267 a wire feed mechanism is driven by a motor mounted in the handle of the torch, with a direct drive to the wire feed rollers. This required the handle to be so large as to be unwieldy for the operator to manipulate.

The main object of the present invention is to avoid this difficulty, and to mount the motor elsewhere on the torch, so as to leave the handle free of the motor and thereby more readily grasped by the operator.

According to the present invention, the motor for driving the wire feed mechanism is mounted on the rear of the torch barrel above the handle. Preferably the motor is aligned with the torch barrel, and provided with a hollow armature through which the wire passes from the flexible wire supply conduit on its way to the feed rolls driven by the motor.

In the drawing the single figure is a vertical longitudinal section through an inert gas shielded metal arc welding torch provided with a motorized wire feed according to the preferred embodiment of the present invention.

The torch shown in the drawing comprises a portable hand gun provided with a frame 10 having a handle portion 14. The barrel portion 12 contains an electrode guide tube 16 secured in an electrode holder or collet body 18 by means of a collet nut 20. A wire electrode 22 passes through the guide tube 16.

Shielding gas such as argon is supplied by a tube 24, and passes through a bore in the collet body 18 and slots in the collet nut 20. An insulating bushing 26 is screwed onto the collet body 18, and a water jacket 28 is screwed onto the bushing 26. A ceramic nozzle tip 30 is screwed into the lower end of the water jacket 28.

Cooling water is supplied through a tube 32 and pipes 34 to the water jacket 28, and returns through a similar pipe to the cooling chamber 36 in the collet body 18. The heated water passes out through a tube 38 which encloses the conductor 40 for supplying welding current to the collet body 18, collet nut 20, and guide tube 16 which serves as a contactor for supplying welding current to the moving wire electrode 22.

The electrode wire 22 is supplied by a wire supply reel 42, through a flexible conduit 44 to the rear of the gun. The wire is pulled out of the conduit 44 and pushed through the guide tube 16 by feed rollers 46 which grip the wire and apply longitudinal thrust thereto. The rollers 46 are driven by gearing 48.

According to the present invention a motor 50 for driving the feed rollers 46 is provided with a hollow armature shaft 52 having a through bore 54 through which the wire 22 passes on its way to the feed rollers 46, guide or contactor 16 and on through the nozzle tip 22. The motor casing 56 is secured to the gun frame 10, and the flexible conduit 44 is secured to a boss 58 on the motor casing, in alignment with the bore of the armature shaft. The gearing 48 is driven by a worm gear 60 rigidly secured to an extension of the armature shaft coaxial with the bore 54.

We claim:

1. An electric arc gun comprising a contactor for supplying electric current to a moving electrode wire, means engaging said wire for feeding it to said contactor, and an electric motor for driving said feeding means having a hollow armature rotatably journaled therein and through which the wire passes on its way to said contactor.

2. A gas shielded arc gun comprising a contactor for supplying electric current to a moving electrode wire, means engaging said wire for feeding it to said contactor, a gas directing nozzle through which said wire passes from said contactor, and an electric motor for driving said feeding means having an armature rotatably journaled therein and provided with an axial passage through which the wire passes on its way to said contactor.

3. An electric arc gun comprising a contactor for supplying electric current to a moving electrode wire, means engaging said wire for feeding it to said contactor, a wire supply reel, a flexible conduit from said reel to said gun, and an electric motor for driving said feeding means having a hollow armature rotatably journaled therein and through which the wire from said conduit passes on its way to said contactor.

4. A gas blanketed metal arc gun having a barrel, an electrically conductive tube inside said barrel adapted to slidably receive electrode wire, a gas confining nozzle mounted on said barrel outside of said tube and extending therebeyond toward the arc to form an orifice, means for supplying electric welding current through said tube to the electrode wire passing therethrough, a reel, a flexible conduit for conducting wire from said reel to said gun, wire engaging means in said gun for feeding wire from said flexible conduit through said tube, a motor having a hollow armature rotatably journaled therein with an axial passage in alignment with said barrel for driving said feeding means for pulling the wire out of said flexible conduit and pushing it through said tube, and means for supplying inert gas to said nozzle to flow along the electrode and shield the arc.

5. Apparatus for gas shielded electric arc welding of metals with an electrode held in a portable hand gun having a handle to be held by the operator, comprising means for supplying a stream containing shielding gas to shield the arc between the electrode and a workpiece, a wire supply reel, a flexible conduit receiving wire from said reel, a wire guide receiving wire from said flexible conduit and directing it toward the arc, feed rollers carried by said gun engaging said wire between the discharge end of said flexible conduit and said wire guide, and a motor having a hollow armature rotatably journaled therein with an axial passage between said flexible conduit and said wire guide for driving said rollers for pulling the wire out of said flexible conduit and through said axial passage and pushing it through said wire guide toward the arc.

References Cited in the file of this patent

UNITED STATES PATENTS

| | | |
|---|---|---|
| 882,878 | Ford | Mar. 24, 1908 |
| 1,963,915 | Kennedy et al. | June 19, 1934 |
| 2,299,785 | Barrett | Oct. 27, 1942 |
| 2,606,267 | McElrath | Aug. 5, 1952 |